United States Patent [19]

Denkinger

[11] Patent Number: 4,981,157
[45] Date of Patent: Jan. 1, 1991

[54] SHUT OFF VALVE

[76] Inventor: Steve Denkinger, 2048 Beacon Manor Dr., Ft. Meyers, Fla. 33907

[21] Appl. No.: 433,958

[22] Filed: Nov. 9, 1989

[51] Int. Cl.$^5$ ............................................. F16K 31/126
[52] U.S. Cl. ..................................... 137/510; 251/61.1
[58] Field of Search ................... 137/87, 510; 251/61.1

[56] References Cited

U.S. PATENT DOCUMENTS

| 2,329,323 | 9/1943 | Benz | 137/510 X |
| 2,962,044 | 11/1960 | Charboneau | 137/510 X |
| 3,693,611 | 9/1972 | Ploss | 251/61.1 X |
| 4,412,553 | 11/1918 | Kopp | 251/61.1 X |
| 4,555,719 | 11/1985 | Arway | 137/510 X |

*Primary Examiner*—Robert G. Nilson
*Attorney, Agent, or Firm*—Donald J. Breh

[57] ABSTRACT

A shut off valve is disclosed including a valve body having a controlled fluid flow passage and a stepped bore intersecting the control fluid flow passage and a valve cap threadedly attached to the valve body and including a supply fluid flow passage. A valve is provided in the bore in the valve body which is responsive to differential pressure between the pressure in the controlled fluid flow passage and the supply fluid flow passage to close the supply fluid flow passage at a predetermined differential pressure.

13 Claims, 2 Drawing Sheets

SHUT OFF VALVE

BACKGROUND OF THE INVENTION

This invention relates to flow control valves and in particular to a shut off valve. In still greater particularity, the invention relates to a shut off valve responsive to a differential pressure between a controlled flow and a supply flow.

Shut off valves are known and utilize either manually operated mechanisms to shut off a fluid flow, or if fluid operated mechanisms are used, either an auxiliary supply of air or hydralic fluid is required or some type of fluid feed back arrangement applied to opposite ends of a valve to move the valve between open and closed positions is utilized. Such systems and valves can be relatively complicated and expensive and simplification is desirable. Although not limited thereto, one system wherein a water shut off valve according to the invention is particularly effective is a water purification system wherein water is directed through a system of filtering, conditioning, storing and piping for ultimate discharge and use, for example, by a consumer. One such system is known as a reverse osmosis system in which a supply of water is filtered and conditioned by the well known reverse osmosis process, stored in a storage tank and drawn off as needed by the user. In such systems, the filtered and treated water is stored under a pressure in a tank for use as needed. Valves, including shut off valves, are typically used to control the pressure of the conditioned water into the storage tank and, although the valve of the present invention is especially suited, adapted and is described for use in such a system, it is to be understood that the valve can be used wherever control of the pressure of one fluid is to be achieved through control of a system fluid supply.

SUMMARY OF THE INVENTION

According to the invention, there is provided a valve body having a flow passage through which a fluid the pressure of which is to be controlled flows, a valve cap having a flow passage through which the main fluid supply flows and valve means in a bore between the two flow passages for shutting off flow of the supply fluid.

According to the invention, the valve means is responsive to a differential pressure between the flows in two passages to shut off flow through the main supply passage at a predetermined pressure differential.

According to another important feature of the invention, the valve means is a disk which is biased to close the supply passage by a spring biased plunger in the bore in the valve body which plunger responds to pressure in the controlled fluid flow passage and the valve disk is responsive to the pressure of the supply fluid on a side opposite the plunger.

According to the invention, when the pressure in the controlled fluid flow passage acting on the plunger reaches a predetermined level relative to the pressure in the supply passage acting on the valve disk in opposition to the spring and controlled flow pressure the valve disk closes the supply fluid passage to shut off the flow thereof thereby maintaining a desired pressure level of the controlled fluid flow as a function of the supply pressure.

BRIEF DESCRIPTION OF THE DRAWINGS

The invention will be better understood after reading the following Detailed Description of the Preferred Embodiment in conjunction with the drawings of which.

DETAILED DESCRIPTION OF THE PREFERRED EMBODIMENT

As noted above, the shut off valve of the present invention can be used in any flow system requiring control of one fluid pressure as a function of another fluid pressure, such as, as a function of a supply pressure, and the invention is not be considered limited to the particular flow system and application with which it is described herein.

Figure 1:
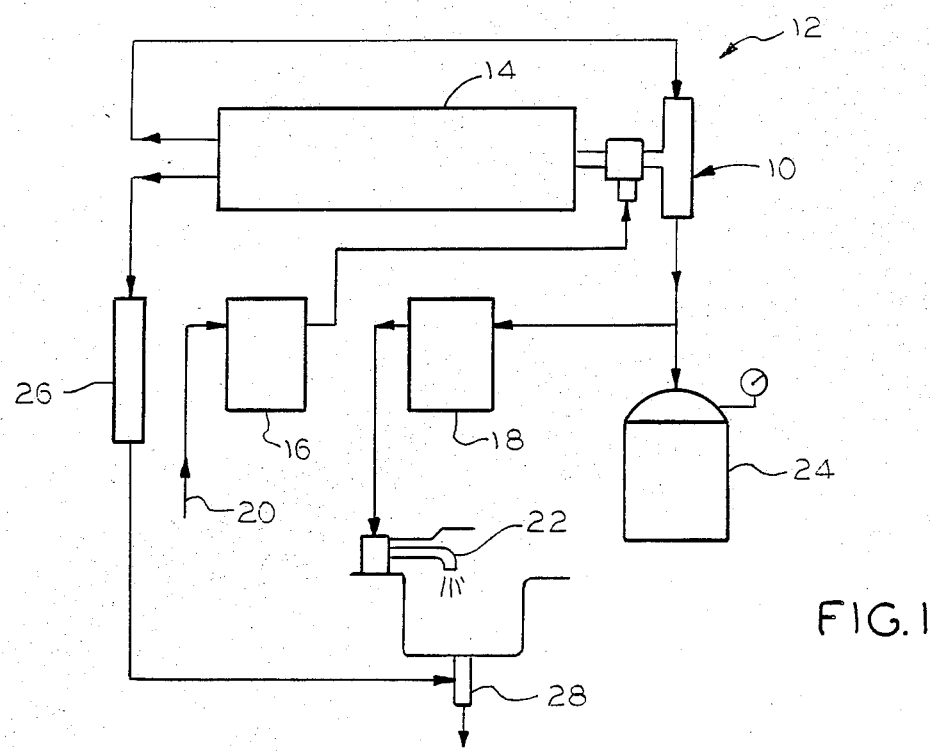
FIG. 1 is a schematic flow diagram of a typical reverse osmosis water purification system employing a shut off valve according the invention.

Shown in FIG. 1, is a shut off valve 10 for use in a reverse osmosis water purification system 12. Such system is shown diagramatically and is generally well known in the art and typically conditions and purifies a water supply 20 by passing the supply first through a prefilter 16 and then through a reverse osmosis membrane 14, through a post filter 18 for delivery to the user's faucet 22. Typically, a holding tank 24 is provided to store and from which conditioned water is drawn as needed. In these systems the membrane 14 is kept clean by running water through the membrane and a restrictor element 26 to flush impurities trapped by the membrane to a common drain 28. In such systems the conditioned water, also known as the permeate, is maintained at a pressure less than the pressure of the supply 20. Control means in the form of a shut off valve 10 is provided which maintains the pressure of the permeate at a predetermined pressure level relative to the supply line pressure 20.

Referring to FIGS. 4–7, the valve 10 includes a valve body 30 including a flow passage 34 between an inlet 36 and an outlet 38. In the application shown, the fluid which pressure is to be controlled, in this case the permeate, enters the pass sage 34 at the inlet 36 and passes out the outlet to the supply tank 24 and the post filter 18. The valve body 30 is also provided with a stepped bore 40 which intersects and communicates with the passage 34. Within the intermediate diameter portion 42 of the stepped bore 40 there is a plunger 44 which is biased outwardly by a spring 46 supported between a shoulder defined by the stepped bore and the underside of the plunger 44.

A valve cap 32 is threadedly attached to the valve body 30 at the large diameter portion 58 of the stepped bore 40 and includes a supply fluid passage in the form of an inlet passage portion 48 having an inlet 50 and into which the supply is introduced and an outlet passage portion 52 having an outlet 54 from which the supply fluid exists. As shown in the drawings, the cap is provided with an annular relief 56 opening toward the large diameter portion 58 of the stepped bore 40 in the valve body. The annular relief 56 communicates with the inlet passage portion 48 by way of the short passage 57 and further defines an annular valve seat surface 62 surrounding the inlet to the outlet passage portion 52.

Figure 4:
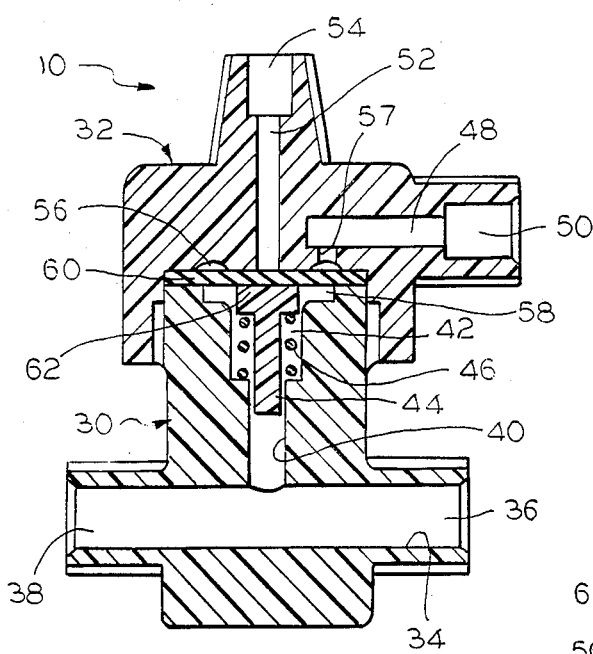
FIG. 4 is a vertical cross-sectional view taken along the line 4—4 in FIG. 3 showing details of construction and the valve in the closed position.
Figure 5:
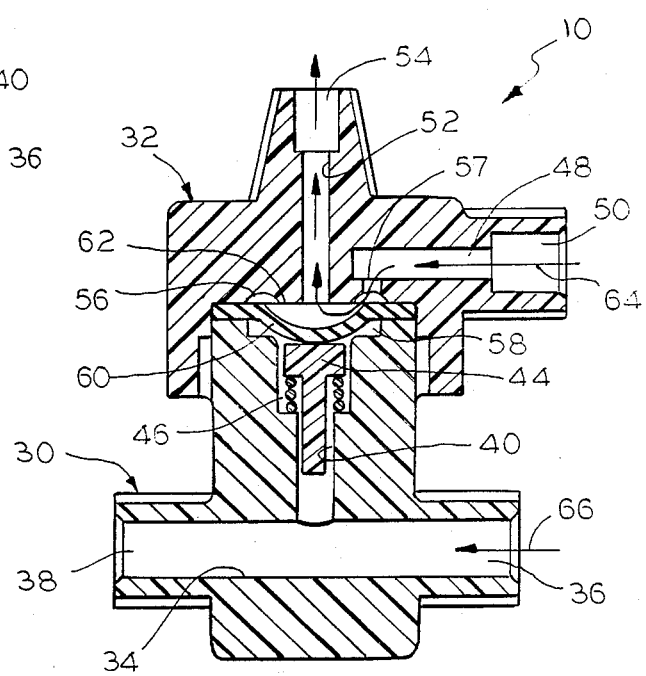
FIG. 5 is a vertical cross-sectional view of the shut off valve showing the valve in the open position.
Figure 6:
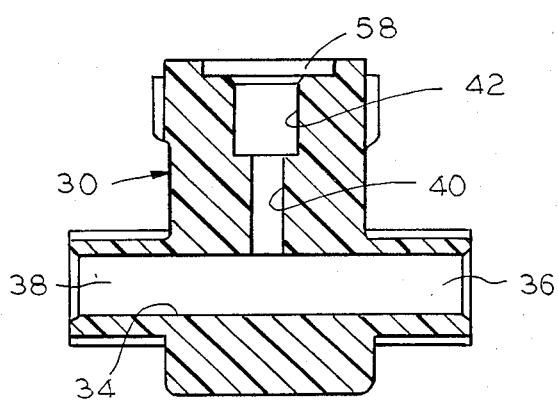
FIG. 6 is a vertical cross-sectional view of the valve body showing details of construction.
Figure 7:
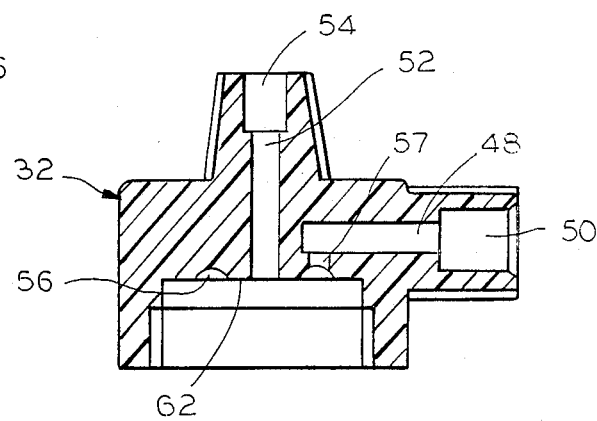
FIG. 7 is a vertical cross-sectional view of the valve cap showing further details of construction.

As shown in FIG. 4, a flexible valve disk 60 is clamped between the valve body 30 and valve cap 32. As shown in FIG. 4, the spring 46 normally biases the plunger 44 against the valve disk 60 and the valve disk in turn normally to a closed position against the valve seat 62 when no flow is present in passage 48. As shown in FIG. 5, the supply fluid is introduced into the inlet passage 48, as shown by the arrow 64. The pressure of the supply fluid causes the flexible disk 60 to flex downwardly against the force of the spring 46 causing the spring 46 to compress allowing the plunger to move downwardly. Accordingly, the valve disk moves off of the valve seat 62 opening the inlet to the outlet passage 52 allowing the supply fluid to pass through the cap out from the outlet 54 and into the reverse osmosis membrane 14 in FIG. 1. The conditioned or permeate water enters the inlet 36 of the valve body 30 as shown by the arrow 60 in FIG. 5, causing pressure to build within the passage 34 and the stepped bore 40 and correspondingly acts on the underside of the plunger 44. As the pressure of the conditioned fluid 66 rises, the plunger will continue to rise in the bore 40 as acted on by the pressure of the fluid and the force of the spring 44 causing the disc to seal on the valve section to close the inlet to the outlet passage 52 in the valve cap 32. It can be seen that the pressure of the conditioned water 66 that exists at 38 can be controlled as a function of the pressure of the supply fluid 20 in the inlet passage 48, controlling the flow of the supply water. Further the pressure differential at which the valve will open and close can be changed by changing the spring rate of the spring 46. In the water purification system shown, it is desirable to maintain the controlled or permeate water at a pressure about 75% to 85% of the pressure of the supply fluid 20 and accordingly, the spring rate of spring 46 is adjusted such that the plunger and thus the valve disk 60 will respond to close at a pressure differential between the pressure in the controlled, conditioned water passage 34 and the pressure in the water supply passage 48 of at least 0.75. Of course, the valve can be adapted to respond to any other pressure differential desired by merely changing the spring 46.

Figure 3:
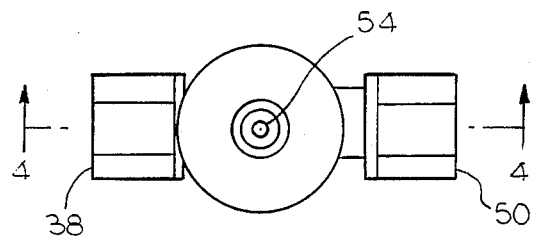
FIG. 3 is a top view of the shut off valve according to the invention.
Figure 2:
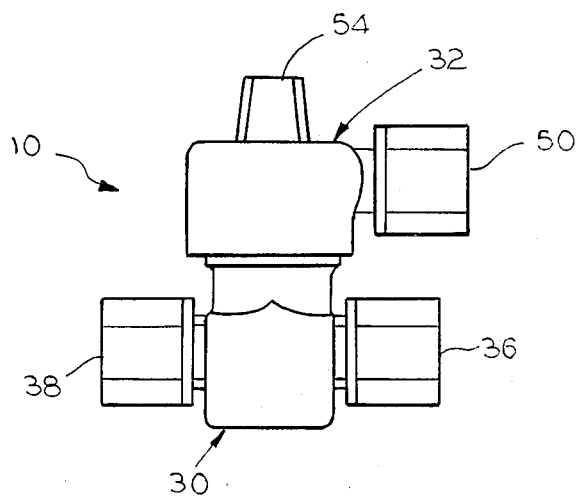
FIG. 2 is a side elevational view of the shut off valve according to the invention.

As shown in the drawings, and in particular as shown in FIGS. 2 and 3, the preferred valve is made entirely of plastic and includes provision for attachment of common female tube fittings at the inlets 36, 50 and at the outlet 38. In the embodiment shown, the outlet 54 includes a common male threaded pipe attachment for direct attachment to a complimentary female pipe fitting or thread on the membrane holder 14.

It can be seen that the shut off valve according to the invention provides for controlling a pressure of one fluid as a function of the pressure of a supply fluid, has few parts, is cost effective to manufacture, is easy to install and service and having described the detailed embodiment of the invention those skilled in the art having the benefit of that detailed description and the accompanying drawings, can readily devise other embodiments and modifications and such other embodiments and modifications are to be considered to be within the scope of the appended claims.

What is claimed is:

1. A shut off valve comprising:
   a valve body including a first fluid flow passage between an inlet and an outlet, said valve body further including a bore communicating with said first fluid flow passage;
   a valve cap removably mounted to said valve body including a second fluid flow passage having an inlet and an outlet; and
   valve means responsive to a difference in pressure between a pressure in said first fluid flow passage for opening and closing said second fluid flow passage at a predetermined difference in pressure, wherein said valve means includes a plunger in said bore, a valve seat in said second fluid passage in said valve cap, a valve member associated with said plunger adapted to sealingly engage said valve seat at a closed position of said valve member and spring means in said bore for biasing said plunger and said valve member toward said valve seat.

2. The shut off valve as defined in claim 1 wherein said valve member is in a normally closed position with no flow in said second fluid low passage.

3. The shut off valve as defined in claim 2 wherein said second fluid flow passage includes an inlet passage portion and an outlet passage portion, said cap includes an annular relief around an entrance into said outlet passage portion in communication with an exit from said inlet passage portion, an annular surface around said entrance into said outlet passage portion defining said valve seat and said valve member is a flexible disk between said cap and said body extending across said entrance into said outlet passage portion and across said annular relief.

4. The shut off valve as defined in claim 3 wherein said plunger is co-axial with said entrance into said outlet passage portion.

5. The shut off valve as defined in claim 3 wherein said outlet passage portion is co-axial with said bore in said valve body and said inlet passage portion is orientated at a right angle to said outlet passage portion.

6. A shut off valve comprising:
   a valve body including a first flow passage between an inlet and an outlet, said valve body including a stepped bore intersecting said first flow passage,
   a plunger in said stepped bore;
   a spring in said stepped bore supported between a shoulder of said stepped bore and said plunger;
   a valve cap removably attached to said valve body at an end of said stepped bore, said valve cap including an inlet passage, and an outlet passage co-axial with said stepped bore, an annular relief around said outlet passage communicating with said inlet passage, said annular relief forming an annular valve seat surface around said outlet passage; and
   a flexible valve disk clamped between said valve body and said valve cap, said spring resiliently biasing said plunger against said valve disk to resiliently hold said valve disk against said valve seat surface, whereby said valve opens and closes an entrance into said outlet passage in response to a predetermined difference in pressure between a pressure in said first flow passage and a pressure in said inlet passage.

7. The shut off valve as defined in claim 6 wherein said valve disk is biased to normally close said entrance into said outlet passage.

8. The shut off valve as defined in claim 6 wherein said spring and said plunger are adapted to cause said valve disk to close said entrance into said outlet passage when the ratio of the pressure in the first passage to the pressure in the inlet passage is above a predetermined ratio.

9. The shut off valve as defined in claim 8 wherein said spring and said plunger are adapted to cause said valve disc to close said inlet into said outlet passage when the ratio of the pressure in said first passage to the pressure in the said inlet passage is at least 0.75.

10. A shut off valve comprising:
a valve body having a controlled fluid flow passage between an inlet and an outlet and a bore, one end of said bore communicating with said controlled fluid flow passage;
a valve cap removably mounted on said valve body at an end of said bore opposite said end which communicates with said controlled fluid flow passage, said cap including a supply fluid flow passage having an inlet and an outlet, said outlet from said supply fluid flow passage connectable to said inlet to said controlled fluid flow passage by way of an external flow element; and
valve means responsive to a fluid pressure differential between the pressure of a controlled fluid in said controlled fluid flow passage and the pressure of a supply fluid in said supply flow passage for closing said supply fluid flow passage when said fluid pressure differential exceeds a predetermined ratio wherein said valve means comprises a flexible disk and a spring biased plunger in said bore, said flexible disk clamped between said valve body and said valve cap and centrally biased by said spring biased plunger to normally close said supply fluid flow passage.

11. The shut off valve as defined in claim 10 wherein said supply fluid flow passage comprises an inlet passage portion and an outlet passage portion, said cap includes an annular relief communicating with said inlet passage portion and forms a valve seat around an inlet to said outlet passage portion, said flexible disk biased against said valve seat, a portion of said flexible valve disk extending across said annular relief, whereby said portion of said valve disk is exposed to pressure of a supply fluid in said inlet passage portion of said supply fluid flow passage.

12. The shut off valve as defined in claim 11 wherein said cap is threadedly attached to said valve body and the inlet and the outlet to said controlled fluid flow passage and at least the inlet to said supply fluid flow passage each include a female tube fitting attachment.

13. The shut off valve as defined in claim 12 wherein the outlet from said supply fluid flow passage includes a male threaded pipe fitting attachment

* * * * *